(12) United States Patent
Eschenbach et al.

(10) Patent No.: US 11,444,300 B2
(45) Date of Patent: Sep. 13, 2022

(54) METHOD FOR THE PREDICTIVE OPERATION OF A FUEL CELL OR A HIGH-VOLTAGE ACCUMULATOR

(71) Applicant: Bayerische Motoren Werke Aktiengesellschaft, Munich (DE)

(72) Inventors: Max Eschenbach, Munich (DE); Johannes Schmid, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 144 days.

(21) Appl. No.: 15/449,016

(22) Filed: Mar. 3, 2017

(65) Prior Publication Data
US 2017/0179512 A1 Jun. 22, 2017

Related U.S. Application Data

(63) Continuation of application No. PCT/EP2015/068426, filed on Aug. 11, 2015.

(30) Foreign Application Priority Data

Sep. 5, 2014 (DE) ..................... 10 2014 217 780.4

(51) Int. Cl.
*H01M 8/04828* (2016.01)
*H01M 8/04858* (2016.01)
(Continued)

(52) U.S. Cl.
CPC ......... *H01M 8/04828* (2013.01); *B60L 1/003* (2013.01); *B60L 50/52* (2019.02);
(Continued)

(58) Field of Classification Search
CPC ......... H01M 8/04828; H01M 8/04225; H01M 8/04223; H01M 8/04253; H01M 8/04701;
(Continued)

(56) References Cited

U.S. PATENT DOCUMENTS 7,976,991 B2 * 7/2011 Goebel .............. H01M 8/04119
429/400
8,470,479 B2 * 6/2013 Becker .............. H01M 8/04141
429/408

(Continued)

FOREIGN PATENT DOCUMENTS

CN 1875513 A 12/2006
CN 101519069 A 9/2009
(Continued)

OTHER PUBLICATIONS

International Search Report (PCT/ISA/210) issued in PCT Application No. PCT/EP2015/068426 dated Oct. 6, 2015 with English-language translation (six (6) pages).
(Continued)

*Primary Examiner* — Frederick M Brushaber
*Assistant Examiner* — Elizabeth Yang
(74) *Attorney, Agent, or Firm* — Crowell & Moring LLP

(57) ABSTRACT

A method for the predictive operation of a fuel cell or a high-voltage accumulator, involving the steps of: detecting at least one external parameter, the at least one external parameter representing driving behavior data, navigation data and/or environmental data; and adjusting the at least one current desired fuel cell operating parameter on the basis of the at least one external parameter.

19 Claims, 2 Drawing Sheets

(51) Int. Cl.

| | |
|---|---|
| *H01M 8/04955* | (2016.01) |
| *H01M 8/04992* | (2016.01) |
| *H01M 16/00* | (2006.01) |
| *H01M 8/04223* | (2016.01) |
| *H01M 8/04701* | (2016.01) |
| *B60L 1/00* | (2006.01) |
| *B60L 53/00* | (2019.01) |
| *B60L 50/52* | (2019.01) |
| *B60L 58/40* | (2019.01) |
| *H01M 8/04225* | (2016.01) |

(52) U.S. Cl.
CPC .............. *B60L 53/00* (2019.02); *B60L 58/40* (2019.02); *H01M 8/04223* (2013.01); *H01M 8/04225* (2016.02); *H01M 8/04253* (2013.01); *H01M 8/04701* (2013.01); *H01M 8/04947* (2013.01); *H01M 8/04955* (2013.01); *H01M 8/04992* (2013.01); *H01M 16/006* (2013.01); *B60L 2240/12* (2013.01); *B60L 2240/22* (2013.01); *B60L 2240/34* (2013.01); *B60L 2240/36* (2013.01); *B60L 2240/642* (2013.01); *B60L 2240/662* (2013.01); *B60L 2240/667* (2013.01); *H01M 2250/20* (2013.01); *H01M 2250/402* (2013.01); *Y02B 90/10* (2013.01); *Y02T 10/7072* (2013.01); *Y02T 10/72* (2013.01); *Y02T 90/14* (2013.01); *Y02T 90/16* (2013.01); *Y02T 90/40* (2013.01)

(58) Field of Classification Search
CPC ........ H01M 8/04947; H01M 8/04955; H01M 8/04992; H01M 16/006; H01M 2250/20; H01M 2250/402; B60L 53/00; B60L 58/40; B60L 50/52; B60L 1/003; B60L 2240/12; B60L 2240/22; B60L 2240/34; B60L 2240/36; B60L 2240/642; B60L 2240/662; B60L 2240/667; Y02B 90/10; Y02T 10/7072; Y02T 10/72; Y02T 90/14; Y02T 90/16; Y02T 90/40
See application file for complete search history.

(56) References Cited

U.S. PATENT DOCUMENTS

| | | | | | |
|---|---|---|---|---|---|
| 8,551,665 | B2* | 10/2013 | Pasera | ............... | H01M 8/04141 |
| | | | | | 429/408 |
| 9,368,817 | B2* | 6/2016 | Folmsbee | ......... | H01M 8/04126 |
| 2003/0118876 | A1 | 6/2003 | Sugiura et al. | | |
| 2006/0003205 | A1* | 1/2006 | Yoshida | ............ | H01M 8/04089 |
| | | | | | 429/429 |
| 2006/0134472 | A1 | 6/2006 | Bach et al. | | |
| 2007/0015016 | A1 | 1/2007 | Aoyama et al. | | |
| 2007/0144183 | A1* | 6/2007 | Sakajo | .................. | F25B 19/005 |
| | | | | | 62/7 |
| 2007/0231639 | A1 | 10/2007 | Yoshida et al. | | |
| 2008/0113236 | A1 | 5/2008 | Binder et al. | | |
| 2009/0222157 | A1 | 9/2009 | Kwon et al. | | |
| 2009/0258270 | A1* | 10/2009 | Kizaki | ................ | H01M 10/615 |
| | | | | | 424/413 |
| 2009/0269635 | A1 | 10/2009 | Muramatsu | | |
| 2010/0081021 | A1* | 4/2010 | Taguchi | ............ | H01M 8/04589 |
| | | | | | 429/412 |
| 2011/0196554 | A1 | 8/2011 | Limbeck et al. | | |
| 2013/0024051 | A1* | 1/2013 | Roederer | .......... | H01M 8/04835 |
| | | | | | 701/3 |
| 2015/0125767 | A1* | 5/2015 | Wake | ................ | H01M 8/04303 |
| | | | | | 429/414 |
| 2016/0240869 | A1* | 8/2016 | Eschenbach | ...... | H01M 8/04701 |
| 2017/0214069 | A1* | 7/2017 | Hoshi | ............... | H01M 8/04731 |

FOREIGN PATENT DOCUMENTS

| | | | | | |
|---|---|---|---|---|---|
| CN | | 103129407 | A | 6/2013 | |
| DE | | 101 31 320 | A1 | 1/2003 | |
| DE | | 102005000611 | A1 * | 2/2006 | ............ B60L 3/0046 |
| DE | 10 2006 045 922 | A1 | 4/2008 | | |
| DE | 10 2007 044 760 | A1 | 4/2009 | | |
| DE | 10 2009 018 848 | A1 | 10/2009 | | |
| DE | 10 2011 112 382 | A1 | 3/2013 | | |
| JP | | 2009-183120 | A | 8/2009 | |
| JP | | 2012169294 | A * | 9/2012 | |

OTHER PUBLICATIONS

German-language Written Opinion (PCT/ISA/237) issued in PCT Application No. PCT/EP2015/068426 dated Oct. 6, 2015 (seven (7) pages).
German Search Report issued in counterpart German Application No. 10 2014 217 780.4 dated Feb. 18, 2015 with partial English-language translation (eleven (11) pages).
Chinese-language Office Action issued in counterpart Chinese Application No. 201580032417.9 dated May 4, 2018 with English translation (fifteen (15) pages).

* cited by examiner

METHOD FOR THE PREDICTIVE OPERATION OF A FUEL CELL OR A HIGH-VOLTAGE ACCUMULATOR

CROSS REFERENCE TO RELATED APPLICATIONS

This application is a continuation of PCT International Application No. PCT/EP2015/068426, filed Aug. 11, 2015, which claims priority under 35 U.S.C. § 119 from German Patent Application No. 10 2014 217 780.4, filed Sep. 5, 2014, the entire disclosures of which are herein expressly incorporated by reference.

BACKGROUND AND SUMMARY OF THE INVENTION

The present invention relates to a method for the predictive operation of a fuel cell or of a high-voltage accumulator.

Fuel cells for mobile applications such as motor vehicles are known from the prior art. In the simplest form, a fuel cell is an electrochemical energy converter which converts fuel and an oxidizing agent into reaction products and in the process produces electricity and heat. For example, in such a fuel cell, hydrogen is used as a fuel and air or oxygen is used as an oxidizing agent. The reaction product of the reaction in the fuel cell is water. The gases are fed here into corresponding diffusion electrodes which are separated from one another by a solid or liquid electrolyte. The electrolyte transports electrically charged particles between the two electrodes. In such fuel cells, the problem occurs that the fuel cell system is continuously subjected to changing conditions. Previous fuel cell systems adapt their setpoint parameters on the basis of instantaneous values. The fuel cell system is not operated here, or not always operated at the optimum operating point.

An object of the present invention is to reduce or eliminate the abovementioned disadvantages.

A fuel cell system according to the technology disclosed here includes the at least one fuel cell and the peripheral system components (also referred to as balance-of-plant components or BOP components) which can be used during the operation of the at least one fuel cell. These components are e.g. oxidizing agent promoters, a voltage converter, a coolant pump and/or regulating valves. A fuel cell includes an anode and a cathode which are separated, in particular, by an ion-selective separator. The anode has a supply for a fuel to the anode. In other words, during operation of the fuel cell system the anode has a fluidic connection to a fuel reservoir. Preferred fuels for the fuel cell system are: hydrogen, low-molecular alcohol, bio-fuels or liquefied natural gas. The cathode for example has a supply for an oxidizing agent. Preferred oxidizing agents are, for example, air, hydrogen and peroxides. The ion-selective separator can be embodied, for example, as a proton exchange membrane (PEM). A cation-selective polymer electrolyte membrane is preferably used. Materials for such a membrane are: Nafion®, Flemion® and Aciplex®. In simplified terms, a system with a fuel cell is often discussed here. If a system component is specified below in the singular, the plural is also intended to be included. For example, a plurality of fuel cells and in some cases a plurality of BOP components can be provided.

The disclosed technology includes a method for the predictive operation of a fuel cell. The method includes the step of detecting at least one external parameter $P_{ext}$, wherein the at least one external parameter $P_{ext}$ represents driving behavior information, navigation information and/or environmental information. The at least one external parameter is a parameter which is not one of the parameters of the fuel cell or of the fuel cell system. Driving behavior information is, for example, information about the driving behavior of the driver. The navigation information is, for example, geographic information, a route profile or traffic information. The environmental information is, for example, weather information or information about a specific area.

The method can also include the step of predicting at least one potential operating parameter $P_{BZ\,pot}$ of the fuel cell on the basis of the at least one external parameter $P_{ext}$. The term predicting is understood here to mean the derivation or calculation or approximation of a future or expected or potential operating parameter $P_{BZ\,pot}$. A prediction can also be merely the detection of a future setpoint parameter which has been input or transferred. For example, a controller can compare empirical values for external parameters with the detected external parameters. On the basis of the detected external parameters and the empirical values, the controller can then predict the potential operating parameter. Such a prediction can be dispensed with, for example, if the controller is configured in such a way that it can determine new setpoint operating parameters directly by taking into account the at least one external parameter.

The method can include the step of adapting the at least one current setpoint operating parameter $P_{BZ\,setp}$ of the fuel cell on the basis of the at least one external parameter $P_{ext}$. The adaptation can advantageously also take place taking into account the current operating parameter. The method can additionally include the step of adapting the at least one current setpoint operating parameter $P_{BZ\,setp}$ of the fuel cell on the basis of the potential operating parameters $P_{BZ\,pot}$.

The at least one setpoint operating parameter $P_{BZ\,setp}$ of the fuel cell can be adapted in such a way that potential changing of the setpoint operating parameter $P_{BZ\,setp}$ is counteracted on the basis of the at least one external parameter $P_{ext}$.

Therefore, the operation of the fuel cell is already advantageously counteracted in advance in a predictive fashion in such a way that existing degradation of the operating state does not occur. This predictive operating mode of the fuel cell for future operating points or operating states permits more efficient operation with a better system performance.

The changing of the at least one setpoint operating parameter $P_{BZ\,setp}$ can be based on the load range and the dynamic requirement. In other words, the control during the changing of one or more setpoint operating parameters can also take into account, inter alia, 1) the current and/or predicted averaged (setpoint) capacity which can be made available on average by the fuel cell or the fuel cell system, and 2) the current and/or predicted (setpoint) dynamic requirement.

The dynamic requirement can be described, for example, by the change in capacity per unit of time required by the driver. For example, it is then possible to detect how many load jumps (and at what level) occur per minute. The dynamic requirement consequently represents the driving style of the driver and is a setpoint capacity change profile of the instantaneous capacity.

The at least one setpoint operating parameter is preferably a parameter from the group:
setpoint temperature of the fuel cell;
setpoint moisture content of the fuel cell;
maximum nitrogen partial pressure at the anode;
setpoint fuel partial pressure at the anode; and/or
setpoint oxidizing agent partial pressure at the cathode.

Operating parameters of the fuel cell are, in the sense of the technology disclosed here, the operating parameters which are assigned directly to the fuel cell itself. These do not include any operating parameters of the BoP component such as, for example, the filling level of the coolant tank of the coolant circuit.

The manipulated variables for influencing the operating parameters of the fuel cell are known from the prior art. For example, the temperature of the fuel cell can be regulated by means of the coolant circuit. For example the fuel cell quantity and oxidizing agent quantity as well as the moisture content can be regulated by means of the stochiometry and the pressures at the anode and the cathode. The concentration of fuel and nitrogen or the partial pressures thereof as well as the moisture content can be influenced, for example, by the recirculation rate in the anode circuit.

The setpoint temperature of the fuel cell includes here the mean temperature of the fuel cell or of the fuel cell stack and the actual setpoint temperature distribution in the fuel cell or in the fuel cell stack, for example also the setpoint temperature at the input or at the output of the fuel cell or of the fuel cell stack.

External parameters which represent navigation information are, for example, navigation parameters, which include geographic information such as, for example, position information, route information and/or altitude profile information. Navigation information is also information about the driving cycle, i.e. the mix of the town cycle component, long inter-city component and/or freeway component in the overall route. Further navigation information is, for example, a relatively long journey with an increased positive gradient (uphill journey) which can often entail operation of the fuel cell in the upper load range. Further navigation information is also, for example, traffic information such as current or future traffic problems. For example, current traffic jam reports or predictable areas of dense traffic owing to large events, business traffic, particular events such as, for example, a large-scale gathering, etc. are included in the navigation information.

Environmental information includes, for example, current or future weather information and/or locality information, for example temperature, air humidity, precipitation, wind speed, air pressure etc. A locality can be, for example, a parking location such as, for example, the garage.

The driving behavior information which represents the behavior of the driver includes, for example, an overtaking frequency, speed profile in the town cycle, in the inter-city cycle, on a freeway; gearshift behavior, etc. The vehicle controller can preferably detect the driver on the basis of measured values, driver-specific inputs and/or driver-specific systems. Driver-specific systems are, for example, key coding or a cell phone which is assigned to a driver and connects to the car. Driver-specific inputs are, for example, the profile selection or the selection of a stored seat position which is assigned to a driver, a clearly assignable route (route to work), mirror setting, etc. A further driver recognition device is, for example, a facial recognition system.

In order to determine the driving behavior, in particular also the vehicle sensor system or any input elements can be used. For example, the following factors can be taken into account: inclination sensor, driving dynamics, transverse acceleration sensor, detection of the pedal dynamics, detection of overtaking maneuvers, driving experience switch, speed profile, position of the pump for the radiator mass throughput rate, position of aerodynamic components such as, for example, rear spoilers, etc. The controller is preferably capable of analyzing the driving behavior and assigning it to a driver. A driving behavior analysis may permit the power requirement to be predicted more precisely and the fuel cell to be operated in a predictive fashion. This advantageously involves a trainable controller, for example based on fuzzy logic. The controller is advantageously also able to analyze recurring conditions and events for example on the basis of detected external parameters. The controller is preferably not only capable of learning from the driving behavior of the driver but can moreover also evaluate navigation information and environmental information and make an optimized prediction of potential operating parameters. For example, the controller is configured in such a way that the fuel cell operation is optimized for recurring routes of a driver, specifically on the basis of the realizations from the previous journeys. An exemplary embodiment of this is, for example, the frequently traveled route between home and work place.

A setpoint operating parameter $P_{BZ\ setp}$ can be, for example, the setpoint temperature of the fuel cell and/or the maximum nitrogen partial pressure at the anode. In the case of predicted operation in the upper load range of the fuel cell, the setpoint temperature and/or the maximum nitrogen partial pressure can be reduced, in particular if only a low cooling capacity can be achieved.

A setpoint operating parameter $P_{BZ\ setp}$ can be, for example, the setpoint moisture content of the fuel cell and/or the setpoint fuel partial pressure at the anode. In the case of predicted operation in the upper load range of the fuel cell, the setpoint moisture content of the fuel cell and/or the setpoint fuel partial pressure at the anode can be increased, in particular if only a low cooling capacity can be achieved.

An upper load region is, for example, a load region of approximately 70% to approximately 100% of the capacity of the fuel cell or of the fuel cell system during continuous operation. A medium load range is, for example, a load range of approximately 20% to approximately 70% of the capacity of the fuel cell or of the fuel cell system during continuous operation. A lower load range is, for example, a load range of approximately 0% to approximately 20% of the capacity of the fuel cell or of the fuel cell system during continuous operation. Continuous operation is considered here to be the resulting average load range or the average capacity which the fuel cell or the fuel cell system has to provide over a certain relatively long observation period, e.g. the duration of a route section (e.g. uphill journey, congestion) on average.

Low cooling capacities are, for example, cooling capacities of approximately 0% to approximately 30% of the maximum cooling capacity which the cooling circuit of the internal combustion engine or of the fuel cell stack can make available.

If, for example, a relatively long uphill journey is detected as an external parameter $P_{ext}$, this can lead to a situation in which a potential fuel cell temperature which is above the permissible temperature is predicted as a potential operating parameter $P_{BZ\ pot}$ on the basis of empirical values. This is because in the case of a relatively long uphill journey the fuel cell is generally operated in the upper load range. In addition, the cooling circuit often achieves only a low cooling capacity owing to the reduced velocity. In such a case, the controller will already reduce the current setpoint operating temperature of the fuel cell, in so far as the current operating parameters permit it, even before the start of the uphill journey. For this purpose, the controller can change, for example, into another operating mode. If the fuel cell is, for example, operated in the partial load range before the uphill journey, the cooling system can more easily make available a disproportionately large amount of cooling capacity. This additional cooling capacity which is not required for the instantaneous partial load operation can be buffered in the cooling system on the basis of the heating capacity of the coolant and the components themselves. During the uphill journey, this buffered cooling capacity can be successively output to the fuel cells under certain circumstances. It may even be appropriate to perform pre-cooling even when the predicted operating temperature of the fuel cell is not in the critical range, but is rather above a certain threshold value, e.g. above 90% of the maximum operating temperature.

In a similar way, system moisture can also be buffered in the fuel cell. If, for example, an imminent relatively long uphill journey, (i.e. upper load range, low cooling capacity) is then detected as an external parameter, the controller can, for example, predict an excessively low moisture content of the fuel cell. In order to avoid the fuel cell drying out during the imminent uphill journey, more moisture can be introduced into the fuel cell even before the start of the uphill journey. For this purpose, the controller can change over, for example, into another operating mode. This additional moisture can be buffered, for example, in the electrode-membrane unit (MEA). This buffered moisture is successively contained during the uphill journey. Drying out can at least be delayed. In a similar way, nitrogen can be depleted before an expected full load event (e.g. uphill journey), and fuel and oxidizing agent can be enriched. Such a predictive operating mode permits optimal operation of the fuel cell, in particular by virtue of the fact that the fuel cell or the fuel cell system functions itself as a buffer.

The method for the predictive operation of the fuel cell can also provide various operating modes. At least two operating modes can differ in at least one characteristic curve for a setpoint operating parameter $P_{BZ\ setp}$. For example, the two operating modes can have different characteristic curves for the setpoint operating temperature of the fuel cells. The various operating modes can be provided for various current and/or predicted load ranges and various current and/or predicted dynamic requirements. The operating mode of the fuel cell can be selected, for example, as a function of the current and/or predicted average capacity to be output by the fuel cell or by the fuel cell system, and the current and/or predicted dynamic requirement. It is therefore possible, on the basis of the empirical values and/or theoretical considerations, to provide, for example, various characteristic curves for the setpoint operating temperature: for example a characteristic curve for the lower load range in the case of a small dynamic requirement, and a characteristic curve for the upper load range and high dynamic requirement.

In the case of predicted operation in the lower load range of the fuel cell, the setpoint moisture content of the fuel cell and/or this setpoint fuel cell partial pressure can be reduced at the anode. In the case of predicted operation in the lower load range of the fuel cells, the setpoint temperature of the fuel cell and/or the maximum nitrogen partial pressure at the anode can be increased.

Certain load ranges such as, for example, the lower load range in the case of predicted low external temperatures can also be avoided entirely, for example by corresponding hybridization, i.e. by adapting the ratio of the (setpoint) capacity of the fuel cell or of the fuel cell system to the (setpoint) capacity of the high-voltage accumulator.

Owing to the reduced kinetics in particular, the cold start or frost start of fuel cells present problems. In this context, the shortest possible warming up phases are aimed at in order to bring the fuel cell system to a state in which it is ready for use. The run-up time or warming up time is shortened if the moisture content of the fuel cell is low during the cold start or frost start. The moisture content can be reduced, for example, by virtue of the fact that after the switching off of the fuel cell or the fuel cell system the oxidizing fluid feed device (generally a compressor) continues to be operated for a certain time period in order to extract moisture from the fuel cell. This process is also referred to as run-on or blow down.

A setpoint operating temperature can be the setpoint moisture content of the fuel cell. The setpoint moisture content is preferably reduced shortly before the predicted end of the journey. If the controller therefore detects that the end of the journey will be reached soon, the controller can set in train a method in which the setpoint moisture content of the fuel cell is already reduced before the end of the journey, in particular if it is to be assumed that a frost start or cold start will follow soon. The run-on can thus advantageously be reduced or even entirely eliminated. As a result, the consumption of energy can be reduced overall. In addition, any noise emissions at the storage location, for example in the garage of the owner, are reduced. For example, the reduction of the setpoint moisture content can be started 20 minutes, preferably 10 minutes, particularly preferably 5 minutes, before the end of the journey. By means of this predictive control, a drying requirement after the parking of the vehicle (blow down) is reduced and/or avoided. Both the length and the setpoint moisture content can be varied depending on the ambient conditions.

The setpoint moisture content and/or the duration of such a blow down can advantageously be adapted by taking into account the predicted storage location of the fuel cell and/or the predicted ambient temperature. For example, a room temperature above a critical temperature at which relatively long run-up times of the fuel cell do not occur can be made available in a garage with a charging station over the entire year. If the vehicle is, however, stored in a mountainous area, the setpoint moisture content will perhaps also even have to be reduced in the early part of the year or in the autumn in order to permit acceptable run-up times of the fuel cell when the next start occurs. In so far as temperatures which are critical for the cold start or frost start could also occur at a storage location with a charging station (garage), it would also be possible to dispense with a blow down during a journey if the garage has been detected as the predicted storage location. The blow down can then take place in shut-down state of the vehicle if it is connected to the charging station.

The disclosed technology also includes a method for operating a motor vehicle. The method for operating a motor vehicle can include the method for operating the fuel cell.

The method, or a method disclosed here, for operating a motor vehicle can also include the step of adapting at least one setpoint operating parameter P HV setp of a high-voltage accumulator as a function of the at least one external parameter $P_{ext}$. In particular, the recharging of the high-voltage accumulator can take place as a function of the at least one external parameter $P_{ext}$. For example, before a storage location with a charging station (e.g. garage) is reached, the high-voltage battery with a low state of charge cannot be charged further from the fuel cell system. Instead, the high-voltage accumulator can then be recharged via the charging station.

The controller of the motor vehicle may be able to perform closed-loop or open-loop control of the hybridization of the high-voltage accumulator and fuel cell as a function of the at least one external parameter $P_{ext}$. If, for example, an imminent traffic jam is detected as an external parameter, the fuel cell can be switched off and the high-voltage battery operates the electric motor alone. The (hybridization) ratio of the capacity of the fuel cell or of the fuel cell system to the capacity of the high-voltage accumulator, which are made available to the drive motor of the motor vehicle, can be adapted as a function of the at least one external parameter $P_{ext}$.

The ratio of the capacity of the fuel cell or of the fuel cell system to the capacity of the high-voltage accumulator is preferably adapted as a function of the operating mode of the fuel cell. If, for example, a "stop-and-go" traffic situation is predicted in which the driver generally operates the vehicle in the low load range in the case of high dynamics, for example operation can be provided merely with the high-voltage battery. In the case of a traffic jam (i.e. lower load range; low dynamics), the fuel cell can also be switched off.

In addition, the ratio of the setpoint capacity of the fuel cell to the setpoint capacity of the high-voltage accumulator can be adapted as a function of the (predicted) storage location of the motor vehicle. For example, before a storage location with a charging station (e.g. garage) is reached, the motor vehicle can supply the drive motor of the vehicle with energy exclusively from the high-voltage accumulator if the state of charge of the high-voltage accumulator permits it. Subsequently, the high-voltage accumulator can then be re-charged via the charging station.

The method can also include the step of reducing consumption and/or switching off of at least one energy consumer, in particular an energy consumer which is not relevant for driving the vehicle. If, for example, it is detected that the next refueling station cannot be reached, the controller of the vehicle can, as an emergency mode, switch off the secondary consumers which are not relevant for the driving mode, or reduce their consumption. This can advantageously be accompanied by the provision of corresponding information to the driver.

The at least one energy consumer is preferably the passenger-compartment air conditioning system (passenger-compartment heating system, passenger-compartment cooling system, etc.) of the vehicle. In the case of predicted operation in the upper load range, the cooling capacity of the passenger-compartment air conditioning can already be reduced or switched off before the operation in the upper load range. The at least one fuel cell can therefore advantageously be supplied with more cooling capacity which is then buffered, for example, in the cooling circuit.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
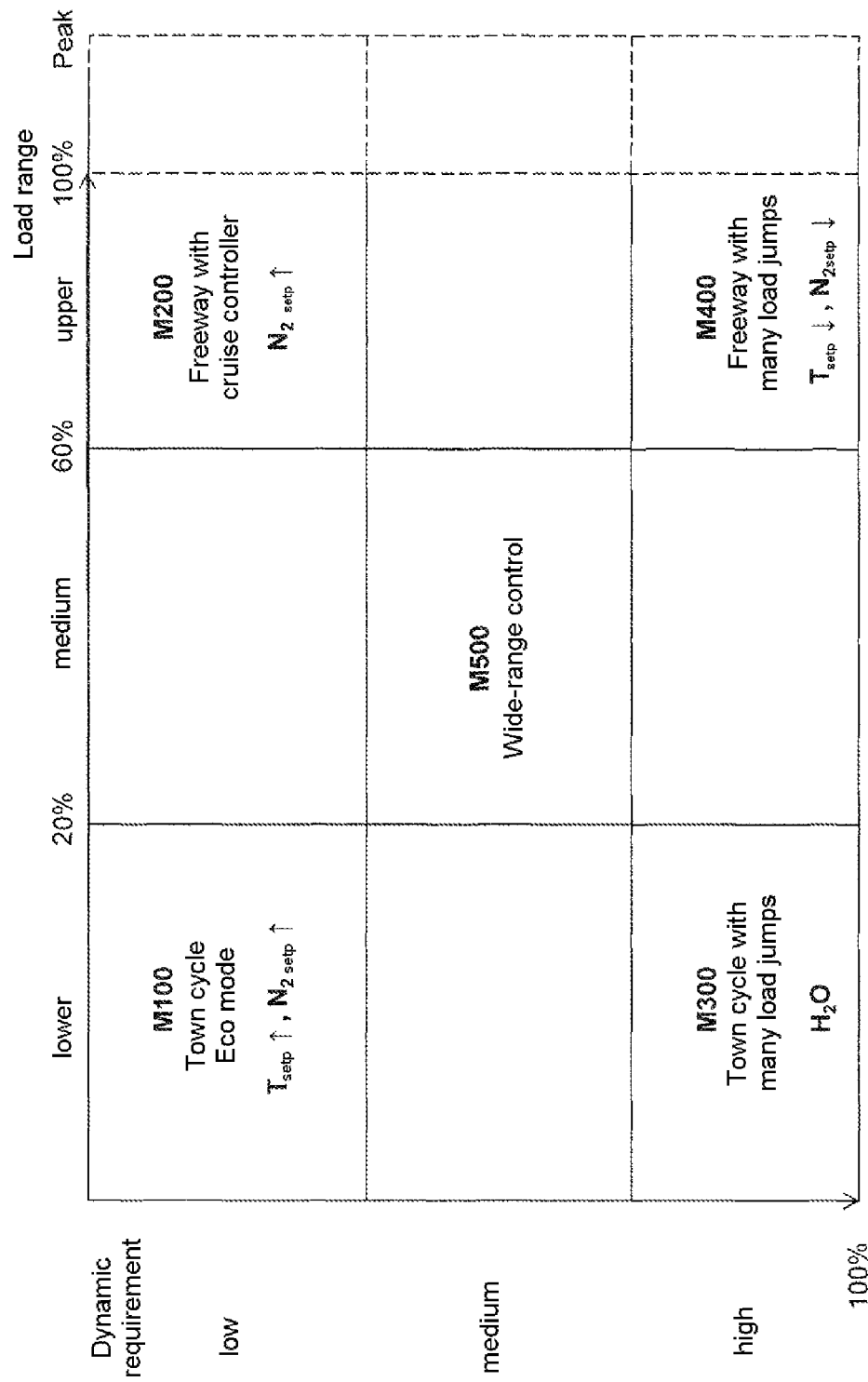
FIG. 1 is a schematic overview of various operating modes.

FIG. 1 shows various operating modes of a fuel cell as a function of the load range and the dynamic requirement made on the fuel cell.

M100 is an operating mode for a lower load range and a lower dynamic requirement such as occur, for example, in the town cycle with a steady driving style. The driver may, for example, also have preselected an environmentally protective ECO mode of the motor vehicle by means of the driving experience switch, in which mode high dynamic requirements for the vehicle are attenuated or prohibited. In this operating mode it is desired that the fuel cell tends to be operated at relatively high temperatures, since the fuel cell operates more efficiently at relatively high temperatures. The temperature characteristic curve therefore tends to exhibit higher temperatures than the temperature characteristic curves of other operating modes. This is possible, since pronounced changes in temperature of the fuel cell are not expected owing to the low dynamic requirements. In addition, the average operating temperature of the fuel cell which results during the continuous operation in the lower load range is sufficiently far away from any temperatures which would be critical for the operation of the fuel cell.

The fuel cell is operated in the lower partial load range at which the nitrogen enrichment is not yet a strong factor. It is therefore permissible to permit comparatively high nitrogen values in this operating mode. In other words, comparatively high characteristic curves are provided for the maximum nitrogen partial pressure in the operating mode M100. The consumption of fuel can therefore be advantageously reduced. The increased recirculation has a positive effect on the water balance of the fuel cell. With respect to the moisture content, a relatively high moisture content is aimed at in the operating mode M100 at which, however, the formation of liquid water in the fuel cell can yet be reliably avoided.

In the operating mode M200, the motor vehicle and the fuel cell are operated continuously in the upper load range. Here, for example a journey on a freeway is assumed. The dynamic requirement is low in this operating mode. For example, the vehicle is always kept at a constant speed with a cruise controller. The operating temperature of the fuel cell is already closer to the maximum temperature of the fuel cell in this load range compared to the operating mode M100. Since there is no risk of pronounced changes in the operating temperature, damage to the fuel cell can also be ruled out in the operating mode M200. The boundary for the maximum nitrogen content in the anode can also be comparatively high in the operating mode M200, which provides the above-mentioned advantages.

M300 denotes an operating mode in which a high dynamic requirement occurs in the lower load range. For example this occurs in the town cycle when the driver adopts a sporty driving style with many load changes. In this mode, for example the water management of the fuel cell may tend to be critical compared to the other operating parameters. The temperature and the nitrogen partial pressure at the anode are generally not critical. The formation of liquid water should be avoided here, for example, by corresponding lambda control, i.e. the control of the supplied quantity of oxidizing agent to the actually required quantity of oxidizing agent. Alternatively or additionally, the operating temperature of the fuel cell can also be increased, as a result of which the moisture content drops.

If the driver drives his motor vehicle on a freeway with many load jumps, (i.e. as sporty driving style) or if such a journey is predicted, the controller M400 changes into the operating mode M400. High operating temperatures usually occur in the upper load range. In addition, changes in temperature are possible owing to load jumps. In the operating mode M400, comparatively low temperature characteristic curves are therefore provided. As it were, comparatively low characteristic curves can be implemented for the maximum nitrogen partial pressure, which can have a positive effect on the capacity of the fuel cell. The moisture content characteristic curve has high values compared to the corresponding characteristic curves of other operating modes. As a result, drying out of the MEA can be at least delayed.

Generally, the controller should be designed to reduce the temperature and/or the moisture content of the fuel cell in the case of a predicted moisture content above a first moisture content threshold value. Conversely, the controller should increase the moisture content if drying out of the fuel cell is predicted, in particular in the operating mode M400.

The operating mode M500 constitutes operation with a medium dynamic requirement in the medium load range. The characteristic curve profiles which are set here are also selected if the operation of the fuel cell cannot be assigned unambiguously to any of the above-mentioned operating modes. These characteristic curves are optimized to the effect that they can be used for all load ranges and all dynamic requests.

Figure 2:
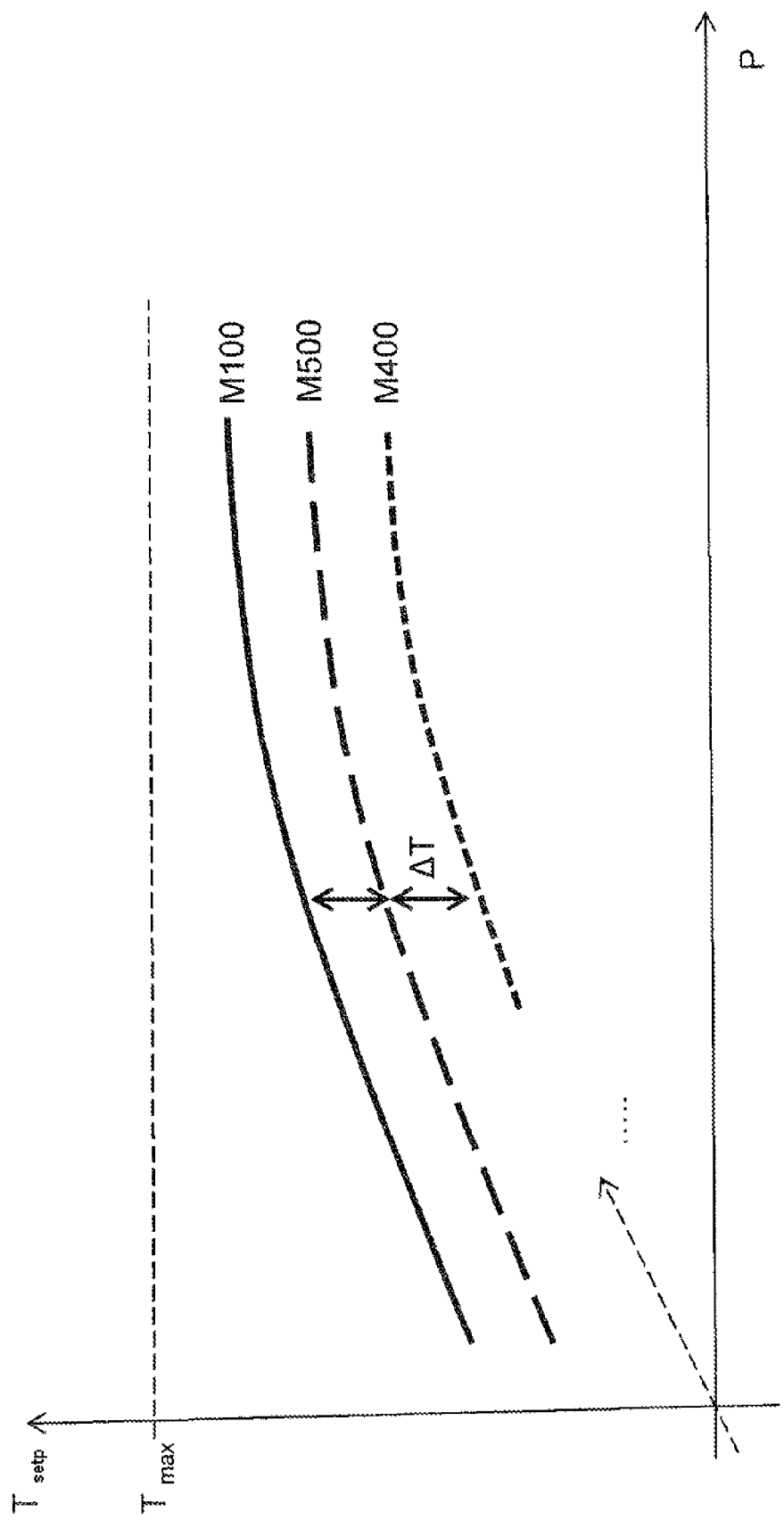
FIG. 2 shows, by way of example, a simplified detail of a multi-dimensional operating characteristic diagram of a fuel cell.

FIG. 2 shows a schematic sectional view of the profile of the temperature characteristic curve for various operating modes plotted against the instantaneous capacity. It is possible to differentiate the required instantaneous setpoint capacity, which depends, for example, on the instantaneous positive gradient and the position of the accelerator pedal, from the previously discussed continuous lower, medium and upper load range. A fuel cell which is operated in the upper load range can have a medium instantaneous setpoint capacity, for example for an instance, for example if one truck overtakes another truck on a freeway. For a specific instantaneous capacity Px, for example a low temperature characteristic curve can be provided in the operating mode M400 than in the operating mode M500. As it were, a comparatively high temperature characteristic curve can be provided for the operating mode M100.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for predictive operation of a fuel cell of a vehicle by a control unit of the vehicle programmed to execute the method, the method comprising the steps of:
    detecting at least one external parameter with a vehicle sensor system, wherein the at least one external parameter represents driving behavior information and/or navigation information of the vehicle;
    predicting, by the control unit, at least one future value of at least one operating parameter of the fuel cell, based on the at least one external parameter, while the fuel cell is currently operated to power the vehicle according to at least one current setpoint for the operating parameter of the fuel cell; and
    adapting, by the control unit, the current setpoint for the operating parameter of the fuel cell, on the basis of the predicted future value of the operating parameter of the fuel cell.

2. The method as claimed in claim 1, wherein a setpoint operating parameter is the setpoint moisture content of the fuel cell, and the setpoint moisture content is reduced before the end of a journey.

3. The method as claimed in claim 2, wherein the setpoint moisture content and/or a duration of the reduction is adapted to take into account a predicted storage location of the fuel cell and/or the predicted ambient temperature.

4. The method as claimed in claim 1, wherein the setpoint moisture content is adapted to take into account a storage location of the fuel cell.

5. The method as claimed in claim 4, wherein before an end of a journey, the setpoint moisture content of the fuel cell is reduced if it is to be assumed that a frost start or cold start is to follow.

6. The method as claimed in claim 1, wherein a change in the at least one setpoint operating parameter is based on a predicted load range and a dynamic requirement.

7. The method as claimed in claim 1, wherein the fuel cell, and/or a fuel cell system comprising the fuel cell, functions itself as a buffer for moisture and/or cooling capacity for a predictive operating mode of the fuel cell.

8. The method as claimed in claim 7, wherein before predicted operation of the fuel cell in an upper load range for an uphill journey:
    the setpoint operating temperature of the fuel cell is lowered and/or additional cooling capacity which is not necessary for the instantaneous operation is made available and is buffered in a cooling system of the fuel cell system, and/or
    additional moisture which is not necessary for the instantaneous operation is introduced into the fuel cell and is buffered in the fuel cell.

9. The method as claimed in claim 1, wherein
    in the case of predicted operation in an upper load range of the fuel cell:
    the setpoint temperature of the fuel cell and/or a maximum nitrogen oxide partial pressure at the anode are/is reduced, and/or
    the setpoint moisture content of the fuel cell and/or the setpoint fuel partial pressure at the anode are/is increased, and/or
    in the case of predicted operation in a lower load range of the fuel cells
    the setpoint temperature of the fuel cell and/or the maximum nitrogen oxide partial pressure at the anode are/is increased, and/or
    the setpoint moisture content of the fuel cell and/or the setpoint fuel partial pressure at the anode are/is reduced.

10. The method as claimed in claim 1, wherein for the predictive operation of the fuel cell various operating modes are provided, wherein at least two operating modes in at least one characteristic curve differ for at least one setpoint operating parameter, and
    wherein the various operating modes are provided for various load ranges and various dynamic requirements, and wherein an operating mode of the fuel cell is selected as a function of a predicted load range and a predicted dynamic requirement.

11. The method as claimed in claim 1, wherein the at least one predicted operating parameter comprises a predicted load range and a predicted dynamic requirement.

12. The method as claimed in claim 1, wherein the at least one external parameter further presents environmental information.

13. A method for operating a motor vehicle by a control unit of the vehicle programmed to execute the method, wherein the method comprises:
    detecting at least one external parameter with a vehicle sensor system, wherein the at least one external parameter represents driving behavior information and/or navigation information of the vehicle;

predicting, by the control unit, at least one future value of at least one operating parameter of the fuel cell, based on the at least one external parameter, while the fuel cell is currently operated to power the vehicle according to at least one current setpoint for the operating parameter of the fuel cell; and adapting, by the control unit, the current setpoint for the operating parameter of the fuel cell, on the basis of the predicted future value of the operating parameter of the fuel cell.

14. The method as claimed in claim 13, further comprising the step of:

adapting a ratio of the setpoint capacity of the fuel cell to the setpoint capacity of a high-voltage accumulator as a function of the at least one external parameter.

15. The method as claimed in claim 14, wherein the ratio of the setpoint capacity of the fuel cell to the setpoint capacity of the high-voltage accumulator is adapted as a function of the operating mode of the fuel cell and/or of the storage location.

16. The method as claimed in claim 13, comprising the step of:

reducing consumption and/or switching off at least one energy consumer.

17. The method as claimed in claim 16, wherein an energy consumer is a passenger-compartment air conditioning system of the vehicle, and in the case of predicted operation in an upper load range, a capacity of the passenger-compartment air conditioning can already be reduced or switched off before operation in the upper load range, with the result that more cooling capacity can be fed to the at least one fuel cell.

18. The method as claimed in claim 13, wherein the at least one predicted operating parameter comprises a predicted load range and a predicted dynamic requirement.

19. The method as claimed in claim 13, wherein the at least one external parameter further presents environmental information.

* * * * *